US011314573B2

(12) United States Patent
Kedlaya et al.

(10) Patent No.: US 11,314,573 B2
(45) Date of Patent: Apr. 26, 2022

(54) DETECTION OF EVENT STORMS

(71) Applicant: Hewlett Packard Enterprise Development LP, Houston, TX (US)

(72) Inventors: Naveena Kedlaya, Bangalore Karnataka (IN); Maneesh Keshavan Bendiganavale, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 347 days.

(21) Appl. No.: 16/206,989

(22) Filed: Nov. 30, 2018

(65) Prior Publication Data

US 2020/0174868 A1 Jun. 4, 2020

(51) Int. Cl.
*G06F 11/07* (2006.01)
*H04L 41/0631* (2022.01)

(52) U.S. Cl.
CPC .......... *G06F 11/079* (2013.01); *G06F 11/076* (2013.01); *G06F 11/0709* (2013.01); *H04L 41/0631* (2013.01)

(58) Field of Classification Search
CPC .. G06F 11/079; G06F 11/0709; G06F 11/076; G06F 11/3006; G06F 11/3055; G06F 11/3409; G06F 11/3466; G06F 11/3051; G06F 11/0751; G06F 11/0754; H04L 41/0604; H04L 41/0627; H04L 41/06; H04L 41/064; H04L 41/0631
See application file for complete search history.

(56) References Cited

U.S. PATENT DOCUMENTS

| | | | | |
|---|---|---|---|---|
| 8,730,816 | B2* | 5/2014 | Carey | G06Q 10/06 370/237 |
| 8,949,676 | B2* | 2/2015 | Behrendt | G06F 11/3006 714/43 |
| 2007/0121674 | A1* | 5/2007 | Chen | G06Q 10/04 370/468 |
| 2010/0052924 | A1* | 3/2010 | Bajpay | H04L 41/0631 340/635 |
| 2010/0198964 | A1* | 8/2010 | Tanaka | G06F 11/3409 709/224 |
| 2012/0246109 | A1 | 9/2012 | Lahiri et al. | |

(Continued)

FOREIGN PATENT DOCUMENTS

| | | | | |
|---|---|---|---|---|
| EP | 3160081 A1 * | 4/2017 | | H04L 41/0609 |
| GB | 2452025 A * | 2/2009 | | H04L 41/0681 |

OTHER PUBLICATIONS

Bulut, A.; "A Unified Framework for Monitoring Data Streams in Real Time"; Apr. 1-8, 2005; 12 pages.

(Continued)

*Primary Examiner* — Yolanda L Wilson
(74) *Attorney, Agent, or Firm* — Jaffery Watson Mendonsa & Hamilton

(57) ABSTRACT

In an example, a first number of events associated with a first event type that are received in the first time window is compared against a first threshold. The first event type is one of a plurality of event types, and each event type corresponds to an amount of resource consumed by an event associated with the event type. It is detected whether events associated with the first event type received in the first time window are part of an event storm based on the first number of events and the first threshold.

20 Claims, 7 Drawing Sheets

(56) References Cited

U.S. PATENT DOCUMENTS

| | | | | |
|---|---|---|---|---|
| 2012/0311153 A1* | 12/2012 | Morgan | ............... | G06F 11/3006 |
| | | | | 709/226 |
| 2013/0166745 A1* | 6/2013 | Dinger | ................... | H04L 41/06 |
| | | | | 709/224 |
| 2013/0179568 A1* | 7/2013 | Huang | ................... | H04L 43/04 |
| | | | | 709/224 |
| 2015/0123784 A1 | 5/2015 | Ebel et al. | | |
| 2017/0192872 A1* | 7/2017 | Awad | ................... | G06K 9/6284 |
| 2018/0157525 A1* | 6/2018 | Song | ................... | G06F 11/0772 |

OTHER PUBLICATIONS

Hewlett Packard Enterprise, "OMi User Guide", Aug. 2017, 373 pages.

HP, "HP Operations Manager for UNIX and Linux 9.01: Message Storm Detection White Paper", Mar. 2010, 31 pages.

Microfocus Community, "Omi Event Storm Suppression Clarification", Feb. 2018, 3 pages, available at https://community.microfocus.com/it_ops_mgt/ops_bdg/f/itrc-162/202917/omi-event-storm-suppression-clarification.

Microfocus, "Event Storm Suppression", Retrieved on Dec. 13, 2021, 2 pages, available at <https://docs.microfocus.com/OMi/10.62/Content/OMi/AdminGuide/event_storm_about.htm>.

* cited by examiner

DETECTION OF EVENT STORMS

BACKGROUND

Devices in a computing environment, such as a data center, may generate events, which may be indicative of functioning of the devices. Sometimes, several events may be generated in a short period of time, such as in the form of a burst. Such events may be referred to as being part of an event storm.

BRIEF DESCRIPTION OF DRAWINGS

The following detailed description references the figures, wherein.

DETAILED DESCRIPTION

Figure 1:
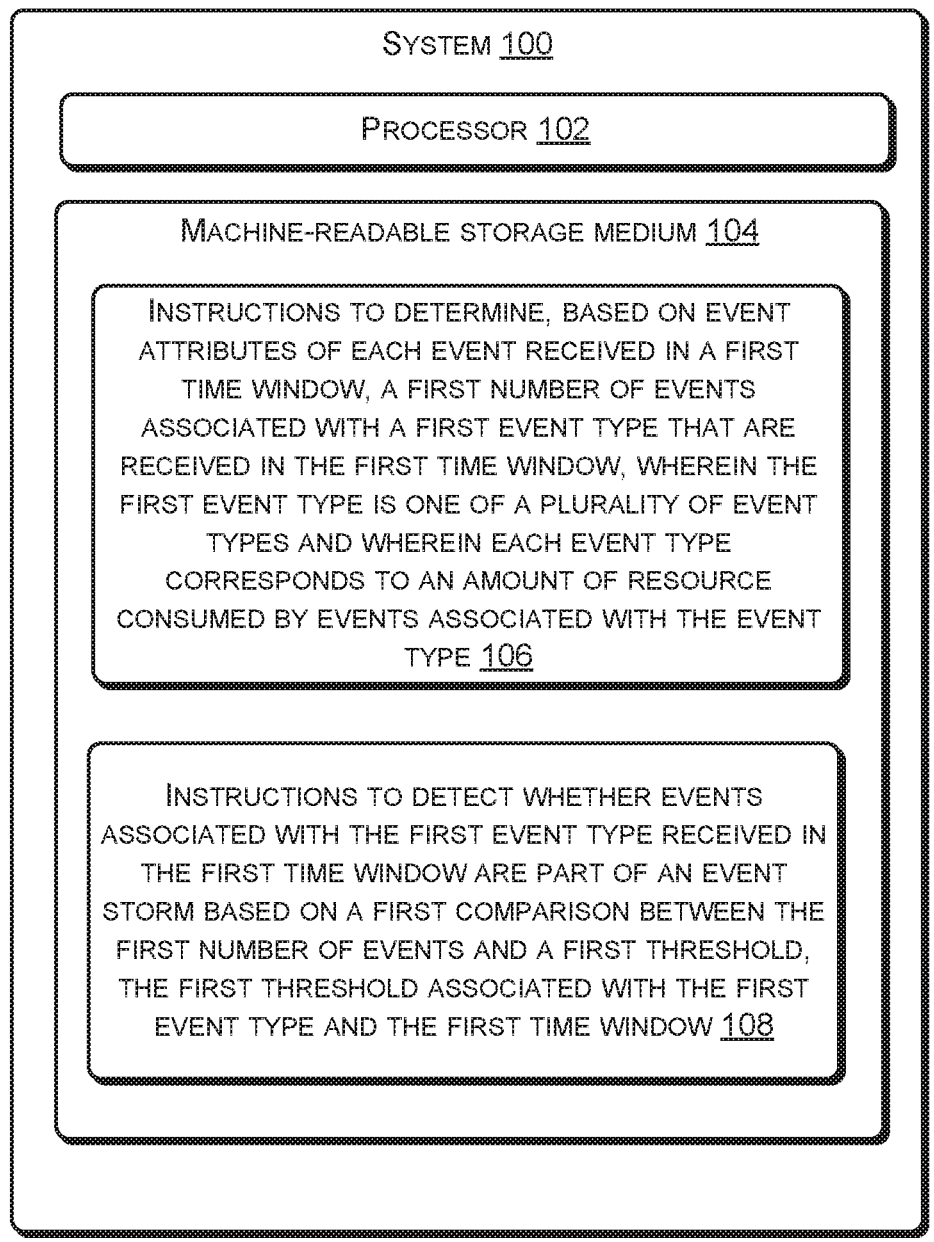
FIG. 1 illustrates a system for detecting an event storm, according to an example implementation of the present subject matter.

Events generated by a device in a computing environment may provide information regarding functioning of the device. For example, an event generated by a computing device may indicate that the temperature of a component of the computing device has exceeded a temperature threshold. In some cases, a large number of events are generated in a relatively short span of time. The large number of events may be referred to as being part of a storm of events or an event storm.

The large number of events of the event storm may cause overloading of a system that handles the events. Such overloading may even cause breakdown of the system. Further, the events of the event storm may be redundant in nature. Accordingly, the event storm is to be detected, and the events may have to be suppressed until the event storm subsides, i.e., the number of events per unit time reduces to a manageable value.

Generally, to detect the occurrence of an event storm, the number of events received in a particular period of time is compared against a threshold number of events. While such a comparison may enable detection of an event storm that occurs in the form of a sudden burst of events, it may not be possible to detect an event storm that involves events that are generated at relatively a lesser frequency, but consume a large amount of resources of the system. Even though such events are generated at a lesser frequency, they may still cause overloading of the system.

The present subject matter relates to detection of an event storm. With the implementations of the present subject matter, overloading of a system that handles events of an event storm may be prevented.

In accordance with an example implementation, a first number of events that are associated with a first event type and that are received in a first time window is determined. The determination may be performed based on attributes, hereinafter referred to as event attributes, of each event received in the first time window. In an example, the first event type may include a first event attribute, and an event may be determined as being associated with the first event type if the event has the first event attribute. The first event type may be one of a plurality of event types. Each event type corresponds to an amount of resource consumed by events associated with the event type. For instance, resource consumption of events associated with the first event type may be different from resource consumption of events associated with a second event type of the plurality of event types.

A first comparison between the first number of events and a first threshold may be performed. The first threshold may be associated with the first event type and the first time window. Based on the first comparison, it may be detected as to whether events associated with the first event type received in the first time window are part of an event storm.

Since events are categorized into different event types, each of which correspond to a particular amount of resource consumption, the present subject matter enables determination of resource consumption due to the events received. Further, by providing a time window and a threshold number of events corresponding to each event type, the present subject matter enables accurate detection of the number of events that is likely to cause overloading of a system that is to handle the events. For instance, if an event is likely to consume a relatively larger amount of resources, the event type associated with the event may have a relatively smaller threshold and a relatively bigger time window associated with it. Therefore, the present subject matter can be used for detection of event storms involving events that are generated at a relatively lesser frequency, but that consume relatively larger amount of resources.

Example implementations of the present subject matter are described with regard to computing environments having a plurality of devices, such as plurality of computing devices and plurality of switches. However, it will be understood that the implementations of the present subject matter can be used for a computing environment having a single device, such as a single computing device, that can generate events.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein, FIG. 1 illustrates a system 100 for detecting an event storm, according to an example implementation of the present subject matter. The system 100 may be implemented as any of a variety of computing systems, such as a desktop computer, a laptop computer, a server, a tablet, and the like. The system 100 includes a processor 102 and a machine-readable storage medium 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the machine-readable storage medium 104. The computer-readable instructions, hereinafter referred to as instructions, includes instructions 106 and instructions 108. The functions of the processor 102 may be provided through the use of dedicated hardware as well as hardware capable of executing machine readable instructions.

The machine-readable storage medium 104 may include any non-transitory computer-readable medium including volatile memory (e.g., RAM), and/or non-volatile memory (e.g., EPROM, flash memory, Memristor, etc.). The machine-readable storage medium 104 may also be an external memory unit, such as a flash drive, a compact disk drive, an external hard disk drive, or the like.

In addition to the processor 102 and the machine-readable storage medium 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable determining a number of events that are associated with a first event type and that are received in a first time window. Each event may be associated with a computing environment, such as a data center (not shown in FIG. 1). For instance, each event may relate to an operation of a device in the computing environment. The number of events associated with the first event type and received in the first time window may be referred to as a first number of events associated with the first event type. The determination of the first number of events may be performed based on attributes of each event that is received in the first time window. The attributes of an event may be referred to as event attributes of the event. In an example, the first event type may include a first event attribute, and an event may be determined as being associated with the first event type in response to the event having the first event attribute, as will be explained with reference to FIG. 2.

The first event type may be one of a plurality of event types. Each event type of the plurality of event types corresponds to an amount of resource consumed by events associated with the event type. For instance, resource consumption of events associated with the first event type may be different from resource consumption of events associated with a second event type of the plurality of event types. The resource consumption of an event may refer to an amount of resources that would be consumed in handling the event. The resource consumed may be, for example, processor resources, memory resources, or storage resources.

Figure 3A:
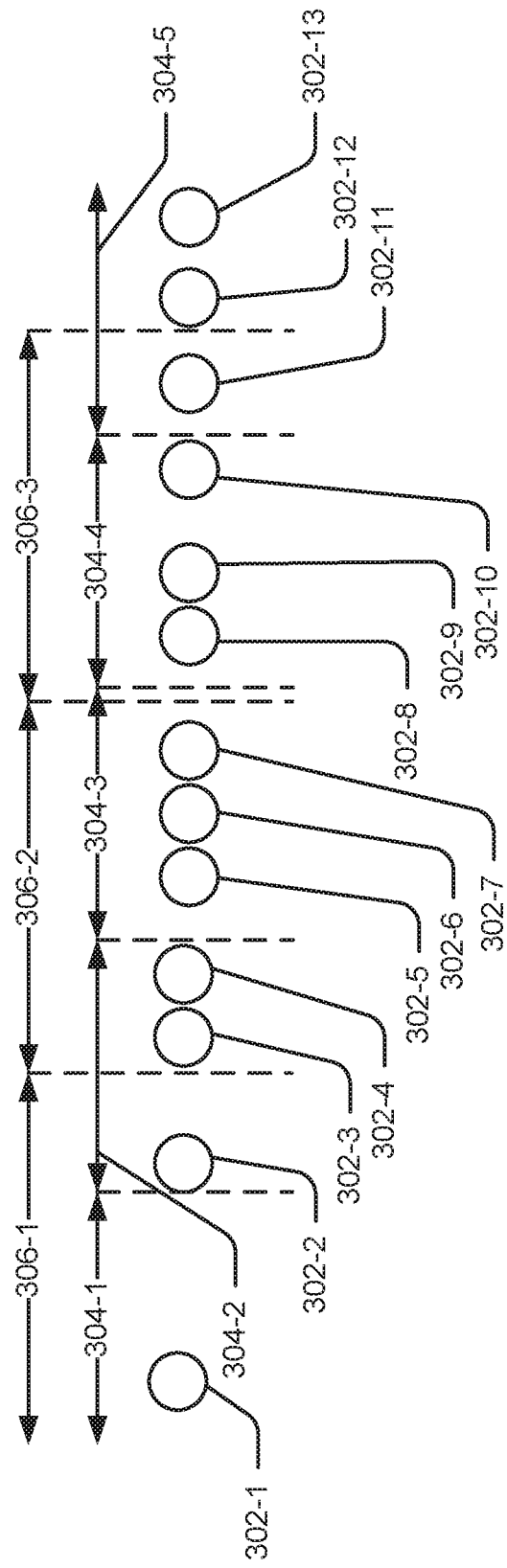
FIG. 3(a) illustrates detecting whether events associated with a first event type are part of an event storm based on a plurality of thresholds, according to an example implementation of the present subject matter.

The instructions 108, when executed by the processor 102, enable detecting whether the events associated with the first event type received in the first time window are part of an event storm based on a comparison between the first number of events and a first threshold. The first threshold may be associated with the first event type and with the first time window. For instance, the first threshold may be different from a threshold associated with the second event type, as will be explained in greater detail with reference to FIGS. 3(*a*) and 3(*b*). The comparison between the first number of events and the first threshold may be referred to as a first comparison.

Figure 2:
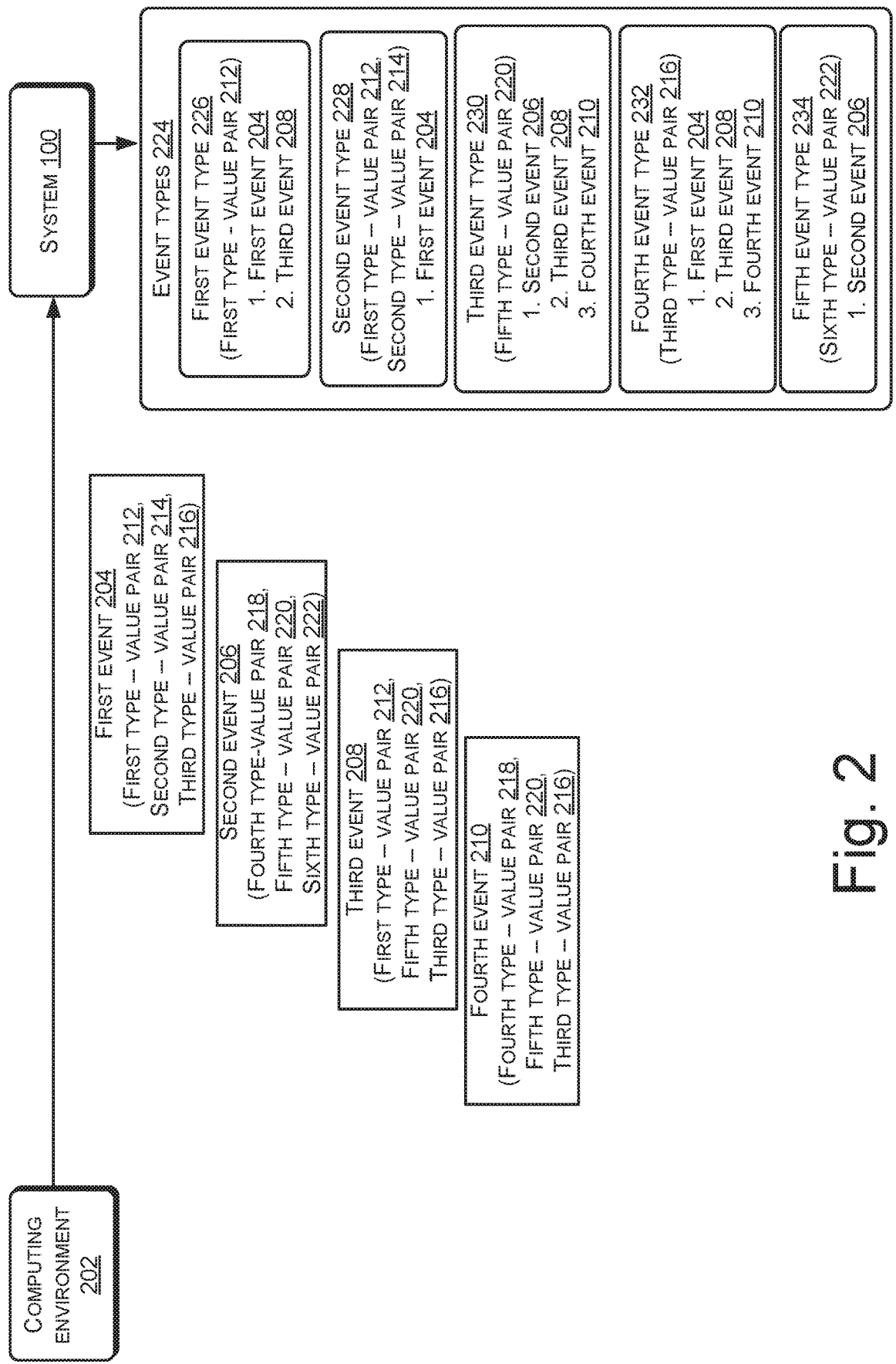
FIG. 2 illustrates identifying events associated with each event type, according to an example implementation of the present subject matter.

FIG. 2 illustrates identifying events associated with each event type, according to an example implementation of the present subject matter. The system 100 may receive events from a computing environment 202 that may include a device, such as a computing device (e.g., a server), a switch, a router, or the like (not shown in FIG. 2). In an example, the computing environment 202 may include a plurality of devices. For instance, the computing environment 202 may be a data center.

The system 100 may be a management station that can be used to monitor events generated in the computing environment 202. To monitor the events generated in the computing environment 202, the system 100 may be connected to the computing environment 202 through a communication network (not shown in FIG. 2). The communication network may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

An event generated in the computing environment 202 may relate to the functioning of a device in the computing environment 202. For example, an event may indicate that a port of a switch is up. Another event may relate to lifecycle of a device. For example, an event may indicate that a server, such as a blade server, is inserted to an enclosure. Upon generation, the events may be received by the system 100 through the communication network. The receiving of an event by the system 100 may be interchangeably referred to as arrival of an event at the system 100. The received event may have to be handled by the system 100 depending upon the nature of the event. For example, if the received event merely provides information, and does not have to be acted upon (also referred to as an "information event"), the system 100 may simply ignore the event or display the event to a user through a user interface (UI). The event indicating that the port of the switch is up is one such event. Contrarily, the received event may indicate a state in the lifecycle of a device (also referred to as a "lifecycle event"), the system may have to perform one or more actions. An event indicating that a server is inserted to an enclosure, an event indicating that a server is removed from the enclosure, and an event indicating that a hard disk is inserted to the server are such events. For example, when the received event indicates that the server is inserted, the system 100 may have to perform the following actions:

i. Configure login credentials,
ii. Configure Network Time Protocol (NTP) client,
iii. Configure Simple Network Management Protocol (SNMP) Agent,
iv. Configure administrator email address,
v. Update firmware, and
vi. Inventory configuration of hardware.

Accordingly, the handling of different events may consume different amount of resources.

In some cases, a set of events may be generated in the computing environment 202 in a particular amount of time and received by the system 100. Sometimes, the arrival of the events may cause overloading of the system 100. For instance, the handling of the events by the system 100 may cause its resource consumption, such as processor consumption, memory consumption, or storage consumption, to increase beyond a resource threshold. A set of events received in a particular period of time may be referred to as being part of an event storm if the amount of resources that would be consumed at a point of time due to the set of events would exceed a threshold amount of resources. The set of events may cause the resource consumption to exceed the resource threshold due to proximity between the points of time at which the events arrive at the system 100 and due to the resources that would be consumed in handling each of the events. Such a set of events is to be detected and is to be subjected to various operations to prevent overloading of the system 100. For example, the events of the set of events may have to be suppressed. The suppression of an event may include not handling the event, i.e., not acting upon the event.

In an example, different events may consume different amount of resources. For example, an information event may consume lesser amount of resources as compared to a lifecycle event. Therefore, while a set of events including 100 information events received in 1 minute may not cause the resource consumption to exceed the resource threshold, a set of events including 25 lifecycle events received in 1 minute may cause the resource consumption to exceed the resource threshold. Further, the resource consumption of lifecycle events may differ depending on the device they relate to. For example, a lifecycle event related to a first server of version 1.0 indicating that the first server is inserted to an enclosure may consume different amount of resources as compared to a lifecycle event related to a second server of version 2.0 indicating that the second server is inserted to the enclosure.

Accordingly, to detect the occurrence of an event storm, the system 100 may classify events received from the computing environment 202 into various event types. An event type may be indicative of an amount of resources consumed by the corresponding events, i.e., events associated with the event type. For example, the amount of resources consumed by events associated with one event type may be different from the amount of resources consumed events associated with another event type. Accordingly, the number of events corresponding to each event type may be monitored independently of the number of events corresponding to other event types. Further, a detection as to the occurrence of an event storm may be performed for events corresponding to each event type independently, as will be explained below.

As illustrated in FIG. 2, a plurality of events may be generated in the computing environment 202 and received by the system 100. The plurality of events includes a first event 204, a second event 206, a third event 208, and a fourth event 210. Each event may include a plurality of attributes, hereinafter referred to as event attributes, which provide various details regarding the event.

Each event attribute may include a pairing of an event attribute type and an event attribute value for the event attribute type. The event attribute types may be the various aspects with which an event can be characterized. For example, the event attribute types of an event may include an originating device, a concerned component of the originating device, and an event significance. The originating device refers to the device of the computing environment 202 at which the event originated and a concerned component of the originating device refers to a component of the originating device to which the event relates. The event significance of an event may be indicative of the amount of handling to be performed to address the event.

An event attribute value may be a value corresponding to an event attribute type for a particular event. The event attribute value may be one of a plurality of possible values for the event attribute type. The plurality of possible values for the event attribute type of originating device may be a first server (not shown in FIG. 2) of the computing environment 202 and a first switch (not shown in FIG. 2). Similarly, the plurality of possible values for the event attribute type of event significance may be lifecycle (indicating large amount of handling), error (indicating medium amount of handling), and information (indicating low amount of handling). Further, the plurality of possible values for the event attribute type of concerned component may be a baseboard management controller (BMC) of the first server and a first port of the first switch. Since each event attribute includes a pairing of an event attribute type and an event attribute value, each event attribute may be referred to as an event attribute type-event attribute value pair, or a type-value pair.

Upon receiving an event from the computing environment 202, the system 100 may determine an event type with which the event is associated. An event type may correspond to a set of event attributes and may be used to classify events based on their respective event attributes. A set of event attributes corresponding to an event type may be indicative of resource consumption of each corresponding event. For instance, each event that has all event attributes of the set of event attributes may consume a particular amount of resources or an amount of resources in a particular range. To determine an event type with which the event is associated, the event attributes of the event may be utilized, as will be explained below:

The first event 204 may include a plurality of event attributes, i.e., a plurality of type-value pairs. For example, the first event 204 includes a first event attribute 212, interchangeably referred to as a first type-value pair 212, which may be a pairing of a first event attribute type and a first event attribute value. The first event attribute type may be, for example, an originating device, and the first event attribute value may be, for example, a first server. The first event 204 may also include a second type-value pair 214, which may be a pairing of a second event attribute type and a second event attribute value. The second event attribute type may be, for example, a concerned component and the second event attribute value may be, for example, the BMC of the first server. The first event 204 may further include a third type-value pair 216, which may be a pairing of a third event attribute type and a third event attribute value. The third event attribute type may be, for example, an event significance and the third event attribute value may be, for example, information.

The second event 206 may include a fourth type-value pair 218, a fifth type-value pair 220, and a sixth type-value pair 222. The fourth type-value pair 218 may be a pairing of the first event attribute type and a third event attribute value. As mentioned earlier, the first event attribute type may be, for example, the originating device, and the third event attribute value may be, for example, a first switch. The fifth type-value pair 220 may be a pairing of the second event attribute type and a fourth event attribute value. The second event attribute type may be, for example, the concerned component and the fourth event attribute value may be, for example, a first port of the first switch. The sixth type-value pair 222 may be a pairing of the third event attribute type and a fifth event attribute value. The third event attribute type may be, for example, the event significance and the fifth event attribute value may be, for example, lifecycle. The third event 208 may include the first type-value pair 212, the fifth type-value pair 220, and the third type-value pair 216. Further, the fourth event 210 may include the fourth type-value pair 218, the fifth type-value pair 220, and the third type-value pair 216.

Each event type of a plurality of event types 224 (interchangeably referred to as "event types 224") may correspond to a set of event attributes, i.e., type-value pairs. For example, a first event type 226 corresponds to the first type-value pair 212, a second event type 228 corresponds to a set of event attributes that includes the first type-value pair 212 and the second type-value pair 214, a third event type 230 corresponds to the fifth type-value pair 220, a fourth event type 232 corresponds to the third type-value pair 216, and a fifth event type 234 corresponds to the sixth type-value pair 222. The event attributes corresponding to an event type may be collectively referred to as a set of event attributes corresponding to the event type. In an example, a set of attributes may have a single event attribute. Further, the set of event attributes corresponding to two different event types may include a common event attribute.

In an example, an event may be said to be associated with an event type if the event has all event attributes of the set of event attributes corresponding to the event type. For example, as mentioned above, the set of event attributes corresponding to the first event type 226 includes the first type-value pair 212. Since the first event 204 includes the first type-value pair 212, it is identified that the first event 204 has all the event attributes of the first event type 226, and the first event 204 may be determined as being associated with the first event type 226. Similarly, since the third event 208 also includes the first type-value pair 212, the third event 208 may also be determined as being associated with the first event type 226. Further, as mentioned above, a set of event attributes corresponding to the second event type 228 includes the first type-value pair 212 and the second type-value pair 214. Since the first event 204 includes both the first type-value pair 212 and the second type-value pair 214, the first event 204 may be determined as being associated with the second event type 228. Similarly, the second event 206, third event 208, and fourth event 210 may be determined as being associated with the third event type 230, the first event 204, third event 208, and fourth event 210 may be determined as being associated with the fourth event type 232, and the second event 206 may be determined as being associated with the fifth event type 234. In an example, to identify an event type associated with an event received from the computing environment 202, the system 100 may compare the event attributes of the event with the set of event attributes corresponding to each of the plurality of event types 224. Since a single event attribute may be part of several sets of event attributes, an event may be associated with more than one event type of the plurality of event types 224.

As will be understood from the above explanation, the set of event attributes corresponding to an event type may be used to identify events that are common in terms of the set of event attributes. Therefore, the set of event attributes corresponding to an event type may be selected as to identify all events that share the set of event attributes. For example, consider the scenario in which the first event attribute type is the originating device and the first event attribute value is the first server and in which the first type-value pair 212 is the pairing of the first event attribute type and the first event attribute value. Accordingly, to identify all the events originating from the first server, the first event type 226 may be defined as to include the first type-value pair 212. In an example, the event attributes that are to be part of a set of event attributes corresponding to each event type may be predefined in the system 100, and the plurality of event types 224 may be stored in the machine-readable storage medium 104 (not shown in FIG. 2).

Further, the set of event attributes corresponding to an event type may be selected such that each event associated with the event type may consume a particular amount of resources or an amount of resources in a particular range. In an example, the set of event attributes corresponding to different event types may be selected such that events corresponding to different event types may consume different amount of resources. For instance, consider a scenario in which events having lifecycle as event significance consumes more resources as compared to events having information as event significance. Accordingly, the fourth event type 232 may be defined such that the set of event attributes corresponding to the fourth event type 232 includes the third type-value pair 216 (a pairing of event significance as the event attribute type and information as event attribute value) and the fifth event type 234 may be defined such that the set of event attributes corresponding to the fifth event type 234 includes the sixth type-value pair 222 (a pairing of event significance as the event attribute type and lifecycle as event attribute value). Therefore, the events associated with the fourth event type 232 may consume more resources of the system 100 as compared to the events associated with the fifth event type 234. Also, consider another scenario where events having lifecycle as event significance and originating from the first server consume more resources compared to events having lifecycle as event significance and originating from the first switch. Accordingly, a sixth event type (not shown in FIG. 2) may be defined such that the set of event attributes corresponding to the sixth event type includes the first type-value pair and the sixth type-value pair 222, and a seventh event type (not shown in FIG. 2) may be defined such that the set of event attributes corresponding to the seventh event type includes the fourth type-value pair 218 and the third type-value pair 216.

Since event types are indicative of an amount of resources consumed by corresponding events, in an example, to detect whether an event associated with an event type is part of an event storm, a number of events associated with the event type may be compared with a threshold number of events corresponding to that event type. Such a threshold number of events may be different from a threshold number of events corresponding to another event type. Further, corresponding to each event type, multiple threshold number of events may be used. A threshold number of events may be referred to as threshold. The details regarding the threshold values will be explained with reference to FIGS. 3(*a*) and 3(*b*).

Although FIG. 2 is explained with reference to a scenario in which the system 100 handles the events from the computing environment 202, in an example, this may not be the case, and the system 100 may be involved in detection of event storms alone.

FIG. 3(*a*) illustrates detecting whether events associated with the first event type 226 are part of an event storm based on a plurality of thresholds, according to an example implementation of the present subject matter. Here, events associated with the first event type 226 are illustrated as circles. For example, the circles 302-1, 302-2, . . . , 302-13 illustrate the events associated with the first event type 226. In an example, the event 302-1 may be the first event 204 and the event 302-2 may be the third event 208. The events associated with the first event type 226 may also be referred to as events of a first event stream.

The events of the first event stream may be received by the system 100 at various points of time. For example, the event 302-1 may be received at a first point of time, the event 302-2 may be received at a second point of time after the first point of time, the event 302-3 may be received at a third point of time after the second point of time, and so on. Further, the events of the first event stream may be received periodically or non-periodically. For example, the difference between the second point of time and first point of time may be same as or different from the difference between the third point of time and second point of time.

In an example, to determine if the events of the first event stream arrive are part of an event storm, the system 100 may determine a number of events of the first event stream received in a time window, such as a first time window 304. To determine the number of events of the first event stream received in a time window, the event type associated with each event received in the time window may be determined in the manner as explained with reference to FIG. 2. The system 100 may determine the number of events of the first event stream for several first time windows. The different first time windows are illustrated by the reference numerals 304-1, 304-2, . . . . However, for the ease of explanation, each of the first time windows 304-1, 304-2, . . . may be referred to as the first time window 304. Further, the different first time windows may be non-overlapping with each other. The first time window 304 may have a first threshold number of events associated with itself, also referred to as a first threshold. As will be explained in greater detail below, if the number of events associated with the first event type 226 received in the first time window 304 exceeds the first threshold, such events may be determined as being part of an event storm.

In an example, to determine if the events of the first event stream are part of an event storm, the system 100 may utilize a plurality of time windows. The plurality of time windows may include the first time window 304 and a second time window 306. The different second time windows are illustrated by the reference numerals 306-1, 306-2, . . . . However, for the ease of explanation, each of the second time windows 306-1, 306-2, . . . may be referred to as the second time window 306. Further, different second time windows may be non-overlapping with each other. In an example, the second time window 306 may be bigger than the first time window 304. Further, the second time window 306 may overlap with the first time window 304. For example, the second time window 306-1 overlaps with the first time window 304-1. The overlapping between the second time window 306 and the first time window 304 may be partial, as illustrated by the overlap between the second time window 306-1 and the first time window 304-2. Similar to the first time window 304, the second time window 306 may also have a threshold associated with itself. Such a threshold may be referred to as a second threshold.

The size of the first time window, size of the second time window, first threshold, and second threshold may be configured in the system 100 based on based on a prior knowledge of an amount of resources consumed by events associated with the first event type 226. For example, consider that, if 3 events associated with the first event type 226 are received in 1 minute, the amount of resources consumed does not increase beyond a resource threshold, and that if more than 3 events are received in 1 minute, the amount of resources consumed exceeds the resource threshold. In accordance with the example, the first time window 304 may be configured as 1 minute and the first threshold may be configured as 3 events. Further, consider also that if more than 4 events are received in 1 minute and 15 seconds, the amount of resources consumed would exceed the resource threshold. In such a case, the second time window 306 may be configured as 1 minute and 15 seconds and the second threshold may be configured as 4 events.

The number of events received in the time window may then be compared with the threshold associated with the time window. For example, the number of events of the first event stream received in the first time window 304 may be compared with the first threshold, and the number of events of the first event stream received in the second time window 306 may be compared with the second threshold. The number of events of the first event stream received in the first time window 304 may be referred to as a first number of events. Similarly, the number of events of the first event stream received in the second time window 306 may be referred to as a second number of events. The system 100 may detect that the events of the first event stream received in the first time window 304 are part of an event storm based on a first comparison between the first number of events and the first threshold. Further, the system 100 may detect that the events of the first event stream received in the second time window 306 are part of an event storm based on a second comparison between the second number of events and the second threshold. The comparison and detection will be explained below with the help of a scenario in which the first threshold is 3 events and the second threshold is 4 events.

As illustrated, in the first time window 304-1, one event (302-1) of the first event stream is received. Since this does not exceed the first threshold, the system 100 may detect that the events of the first event stream received in the first time window 304-1 are not part of an event storm. Further, in the second time window 306-1, two events (302-1 and 302-2) of the first event stream are received. Since this does not exceed the second threshold, the system 100 may detect that the events of the first event stream received in the second time window 306-1 are not part of an event storm. Subsequently, in the first time window 304-2, 3 events of the first event stream are received. Since this is not greater than the first threshold, the system 100 may detect that the events are not part of the event storm. However, in the second time window 306-2, 5 events of the first event stream are received. Since this exceeds the second threshold, the system 100 may detect that the events of the first event stream received in the second time window 306-2 are part of an event storm. Such a detection may continue for subsequent time windows as well.

In an example, each event type may have corresponding time windows and thresholds. For example, the first time window 304, second time window 306, first threshold, and second threshold corresponding to the first event type 226 may be different from a third time window, fourth time window, third threshold, and fourth threshold, respectively, corresponding to the second event type 228, as will be explained with reference to FIG. 3(*b*).

Although not shown in FIG. 3(*a*), in addition to the first time window, second time window, first threshold, and second threshold, additional time windows and thresholds associated with the additional time windows may also be utilized to detect whether events of the first event stream are part of an event storm.

Figure 3B:
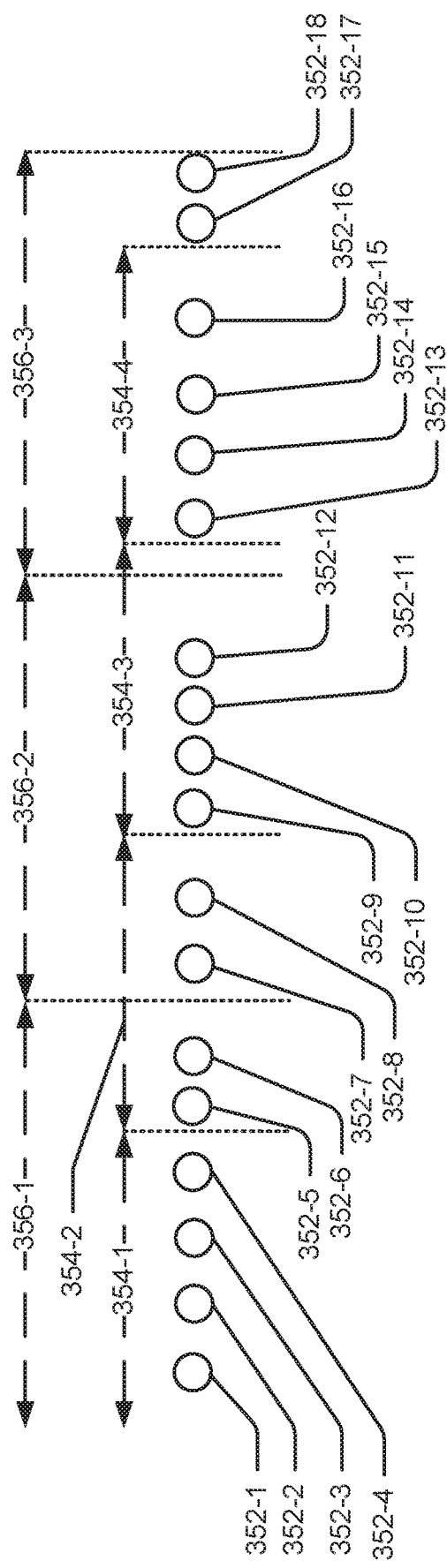
FIG. 3(b) illustrates detecting whether events associated with a second event type are part of an event storm based on a plurality of thresholds, according to an example implementation of the present subject matter.

FIG. 3(b) *illustrates* detecting whether events associated with the second event type 228 are part of an event storm based on a plurality of thresholds, according to an example implementation of the present subject matter. Here, the events associated with the second event type 228 are represented by circles, such as 352-1, 352-2, . . . . The events associated with the second event type 228 may be referred to as events of a second event stream. The second event type 228 may also have a third time window 354 associated with itself. The second event type 228 may also have other time windows associated with itself, such as a fourth time window 356. Further, each time window may have a threshold associated with it. The threshold associated with the third time window 354 may be a third threshold and the threshold associated with the fourth time window 356 may be a fourth threshold.

In an example, the third time window 354 may be different from the first time window 304 and the fourth time window 356 may be different from the second time window 306. Further, the third threshold may be different from the first threshold, and the fourth threshold may be different from the second threshold. The difference in the time windows and the thresholds between the first event type 226 and the second event type 228 may be due to a difference in the resource consumption of events associated with the first event type 226 and the second event type 228.

A size of the third time window 354 and third threshold may be configured based on a prior knowledge of an amount of resources consumed by events associated with the second event type 228. Further, if the fourth time window 356 is also used, a size of the fourth time window 356 and fourth threshold may also be configured based on the prior knowledge of the amount of resources consumed by events associated with the second event type 228.

As with the events of the first event stream, the system 100 may determine the number of events of the second event stream that are received in the third time window 354. The number of events of the second event stream that are received in the third time window 354 may be referred to as a third number of events. Further, the number of events of the second event stream that are received in the fourth time window 356 may also be determined. The number of events of the second event stream that are received in the fourth time window 356 may be referred to as a fourth number of events. Further, such number of events may be compared with their respective thresholds to detect whether events of the second event stream are part of an event storm. For example, consider that the third threshold is 4 events and the fourth threshold is 5 events. Accordingly, by comparing the third number of events received in the third time windows 354-1, 354-2, and 354-3 with the third threshold, the system 100 may detect that the events of the second event stream received in the third time windows 354-1, 354-2, and 354-3, respectively, are part of an event storm. The comparison of the third number of events with the third threshold may be referred to as a third comparison and the comparison of the fourth number of events with the fourth threshold may be referred to as a fourth comparison.

Similar to the first event stream and second event stream, the occurrence of event storms in events of other event streams can also be detected, such as third event stream, fourth event stream, and fifth event stream, which include events associated with the third event type 230, fourth event type 232, and fifth event type 234, respectively.

The detection of event storms based on thresholds corresponding to particular event types enables accurate detection of event storms. For instance, if events associated with the fifth event type 234 consume more resources as compared to events associated with the fourth event type 232, a threshold corresponding to the fifth event type 234 may be maintained at a lower value compared to a threshold corresponding to the fourth event type 232. Accordingly, the present subject matter can be used to detect even those event storms that do not occur in the form of a burst of events in a short period of time, but occur in the form of sustained and medium-frequency flow of events. Further, maintaining different thresholds for different event types also prevents false alerts regarding an event storm. For instance, if the threshold corresponding to the fifth event type 234 is maintained at a lower value compared to the threshold corresponding to the fourth event type 232, it is ensured that more events associated with the fourth event type 232 can be received without being detected as being part of an event storm.

Further, the detection of the event storms based on a plurality of time windows and a plurality of thresholds, as explained above, enables detection of event storms that may otherwise go un-detected. For instance, if the first time window 304 and the first threshold alone were used to detect the event storm, it may not have been possible to detect that the events of the first event stream are part of an event storm. For example, referring to FIG. 3(a), even though a pattern of arrival of events of the first event stream is such that the number of events in any first time window 304 does not exceed the first threshold, the number of events in several first time windows (304-2, 304-3, 304-4, and 304-5) is consistently higher, such as equal to the first threshold. By providing the second time window 306 and by monitoring the second number of events in the second time window 306, such an event storm can be detected.

Subsequent to detection that the events of an event stream are part of an event storm, the system 100 may undertake remedial actions to prevent overloading of the system 100. Such remedial actions may include, for example, suppressing the events of the event stream, as will be explained with reference to FIG. 4.

Figure 4:
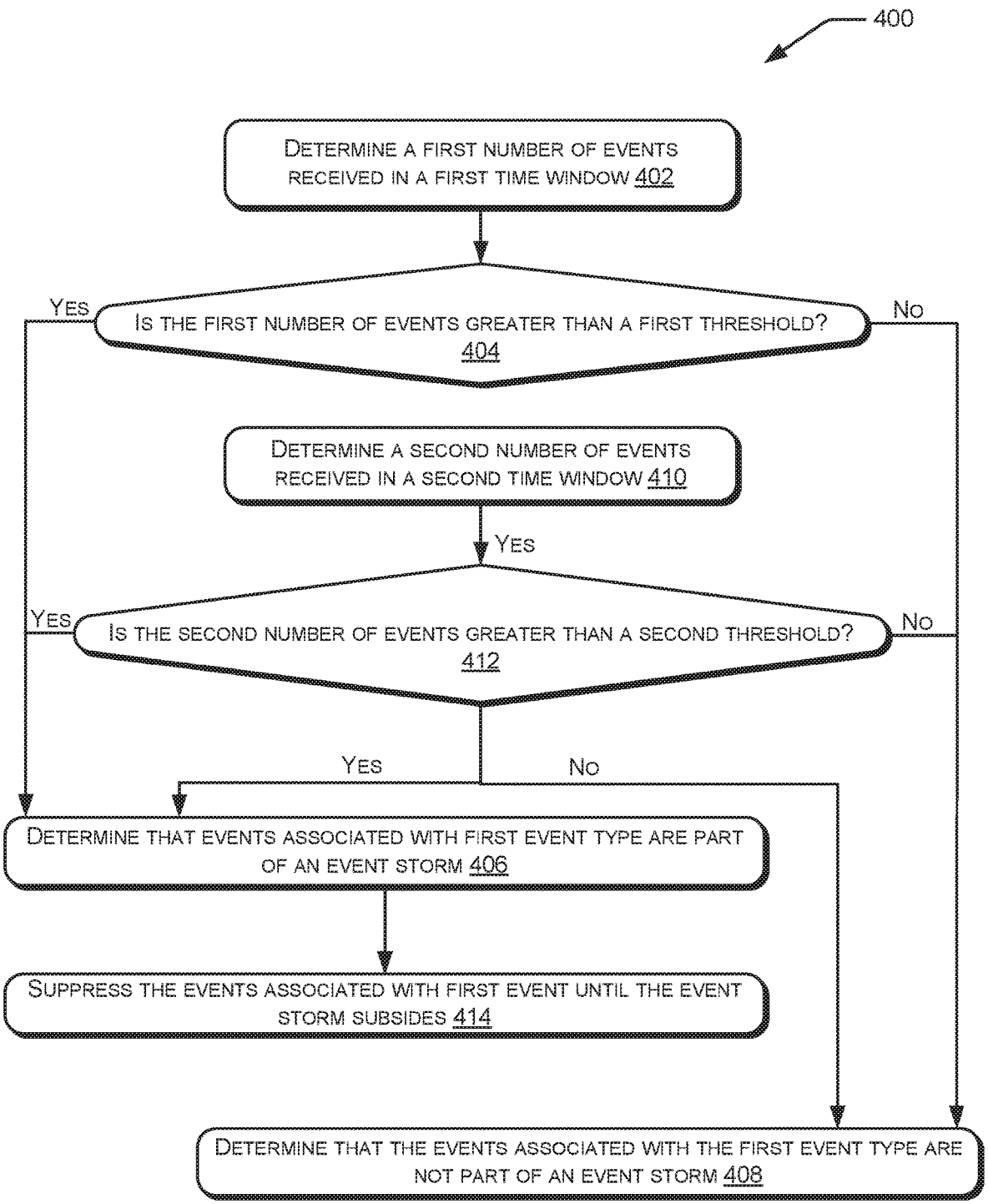
FIG. 4 illustrates a method for detecting whether events of an event stream are part of an event storm, according to an example implementation of the present subject matter.

FIG. 4 illustrates a method 400 for detecting whether events of an event stream are part of an event storm, according to an example implementation of the present subject matter. The method 400 may be performed by the system 100.

The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media.

Referring to method 400, at block 402, a first number of events of an event stream, such as the first event stream, received by the system 100 in a first time window, such as the first time window 304, is determined. Subsequently, at block 404, the first number of events may be compared with a first threshold and it may be determined as to whether the first number of events is greater than the first threshold. The first threshold may be a threshold associated with the first time window, as explained with reference to FIG. 3(a). The comparison of first number of events with the first threshold may be referred to as a first comparison.

If it is determined that the first number of events is greater than the first threshold, at block 406, the system 100 may determine that the events of the event stream, such as the first event stream, received in the first time window are part of an event storm. Otherwise, if it is determined that the first number of events is not greater than the first threshold, at block 408, the system 100 may determine that the events of the event stream received in the first time window are not part of an event storm.

At block 410, a second number of events of the event stream received by the system 100 in a second time window, such as the second time window 306, is determined. Subsequently, at block 412, the second number of events may be compared with a second threshold and it may be determined as to whether the second number of events is greater than the second threshold, which may be a threshold associated with the second time window. The comparison of the second number of events with the second threshold may be referred to as a second comparison.

If it is determined that the second number of events is greater than the second threshold, at block 406, the system 100 may determine that the events of the event stream received in the second time window are part of an event storm. Otherwise, if it is determined that the second number of events is not greater than the second threshold, at block 408, the system 100 may determine that the events of the event stream received in the second time window are not part of an event storm.

In an example, the first comparison and second comparison are performed concurrently, and not sequentially. Further, such comparisons may be performed continuously, i.e., for consecutive time windows. Accordingly, events of an event stream may be detected as being part of an event storm if any of the first and second comparisons indicate that a number of events received in a time window is greater than the respective threshold. Further, the comparisons may be performed for each event stream. Therefore, event storms in any event stream can be detected.

Subsequent to the determination at block 406 that the events of the event stream are part of an event storm, at block 414, the system 100 may suppress events of the event stream. The suppression of events of the event stream by the system 100 may include ignoring of the events of the event stream by the system 100, acting upon a single event of a plurality of events of the event stream by the system 100, or the like. The suppression of the events of the event stream ensures that the system 100 is not overloaded with the events. In an example, the suppression of the events may continue until the event storm subsides. To determine whether the event storm has subsided, the system 100 may utilize the results of the first comparison and second comparison. For instance, if the first number of events is lesser than the first threshold and second number of events is lesser than the second threshold, the event storm may be said to have subsided, and the suppression of events may be discontinued.

Figure 5:
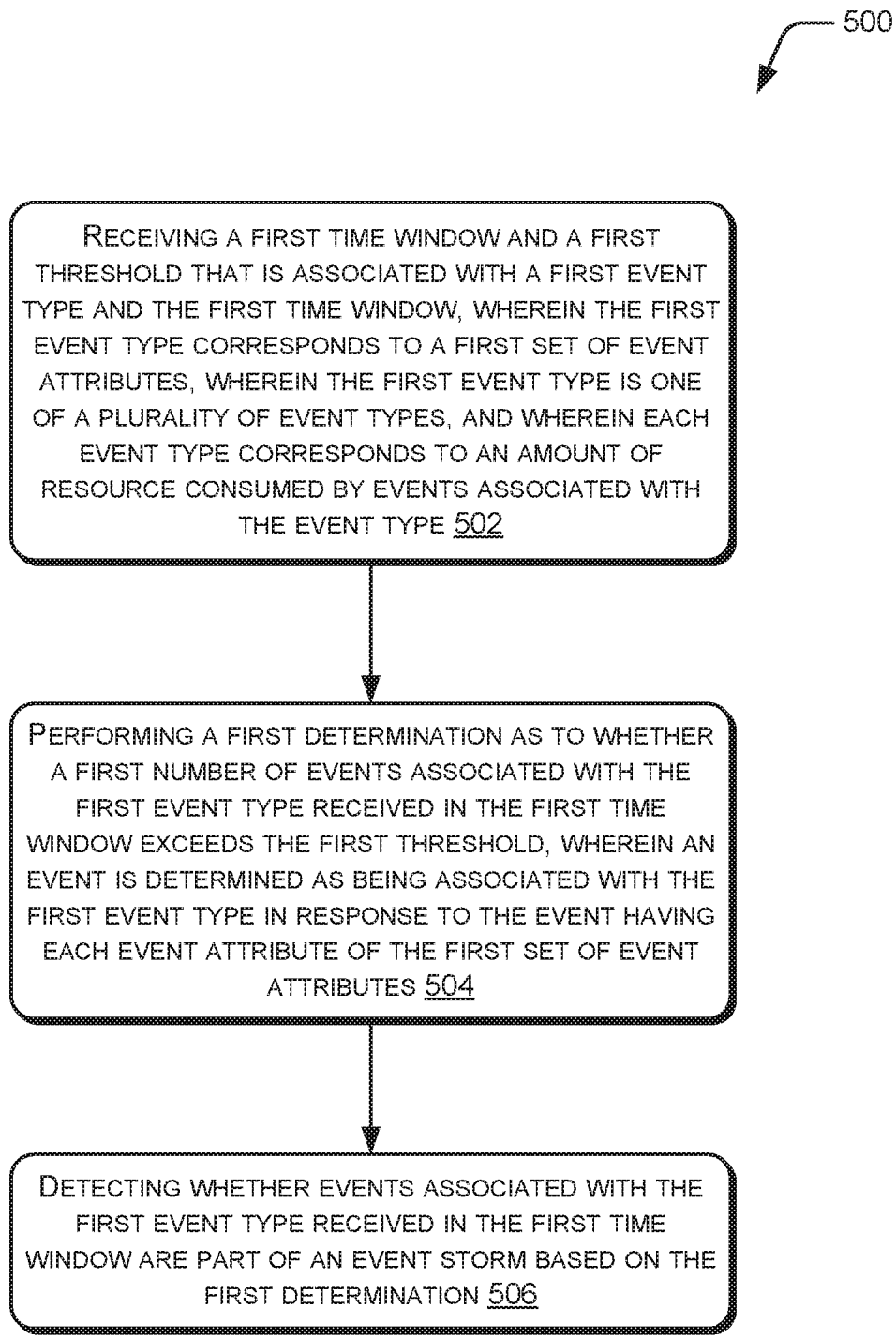
FIG. 5 illustrates a method for detecting an event storm, according to an example implementation of the present subject matter.

FIG. 5 illustrates a method 500 detecting an event storm, according to an example implementation of the present subject matter.

The order in which the method 500 is described is not intended to be construed as a limitation, and any number of the described method blocks may be combined in any order to implement the method 500, or an alternative method. Furthermore, the method 500 may be implemented by processing resource(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 500 may be implemented in a variety of systems, the method 500 is described in relation to the aforementioned system 100, for ease of explanation. In an example, the method 500 may be performed by a processing resource, such as the processor 102.

At block 502, a first time window and a first threshold that is associated with a first event type and the first time window are received. The first event type corresponds to a first set of event attributes and is one of a plurality of event types. Each event type may correspond to an amount of resource consumed by corresponding events. For example, each event type may differ from another event type in terms of the resource consumption of events associated with them. The first event type may be, for example, the first event type 226. Accordingly, the first set of event attributes may include the first type-value pair 212. Further, the first time window may be, for example, the first time window 304.

At block 504, it may be determined as to whether a first number of events associated with the first event type received in the first time window exceeds the first threshold. Such a determination may be referred to as a first determination. In an example, an event is determined as being associated with the first event type in response to the event having each event attribute of the first set of event attributes.

At block 506, it is detected whether events associated with the first event type received in the first time window are part of an event storm based on the first determination. For example, if the first number of events is greater than the first threshold, the events associated with the first event type received in the first time window are determined as being part of an event storm.

In addition to the first determination and detection of the event storm based on the first determination, the present subject matter may utilize additional determinations for detection of an event storm. For instance, the method 500 may include receiving a second time window and a second threshold associated with the first event type. The second time window may be, for example, the second time window 306. The second time window may be bigger than the first time window and may overlap with the first time window.

The method 500 may also include performing a second determination as to whether a second number of events associated with the first event type received in the second time window exceeds the second threshold. Based on the second determination, it is detected whether events associated with the first event type received in the second time window are part of an event storm.

The method 500 may also include performing a third determination as to whether a third number of events associated with the second event type received in a third time window exceeds a third threshold. Based on the third determination, it is detected whether events associated with the second event type received in the third time window are part of an event storm. In an example, the third time window may be different from the first time window and the third threshold may be different from the first threshold. Further, in an example, each event, such as the events associated with the first event type and the events associated with the second event type may be received from a computing environment, such as a data center.

Figure 6:
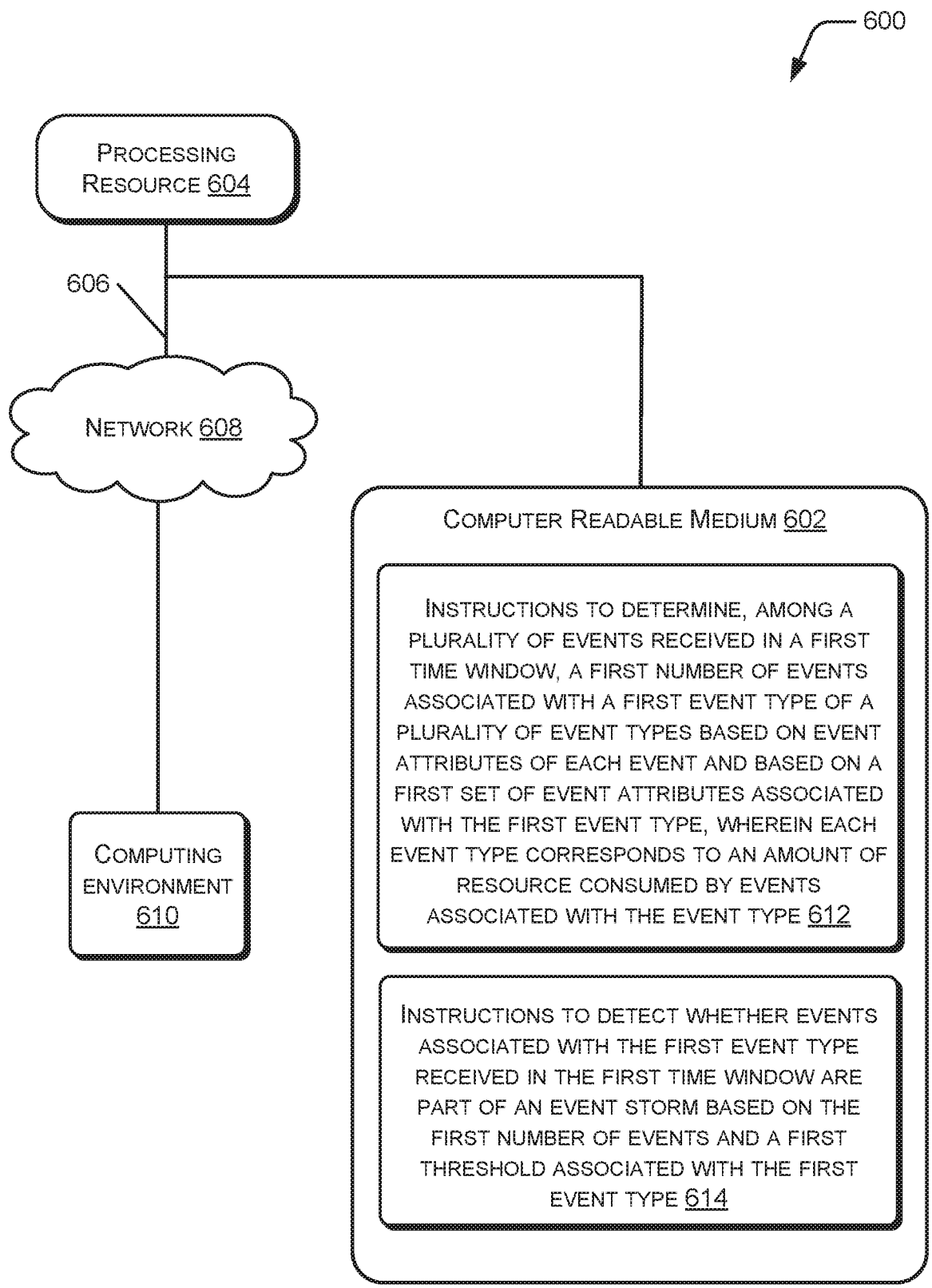
FIG. 6 illustrates a computing environment, implementing a non-transitory computer-readable medium for detecting an event storm, according to an example implementation of the present subject matter.

FIG. 6 illustrates a computing environment 600, implementing a non-transitory computer-readable medium 602 for detection of event storms, according to an example implementation of the present subject matter.

In an example, the non-transitory computer-readable medium 602 may be utilized by a system, such as the system 100. The system 100 may be implemented in a public networking environment or a private networking environment. In an example, the computing environment 600 may include a processing resource 604 communicatively coupled to the non-transitory computer-readable medium 602 through a communication link 606.

In an example, the processing resource 604 may be implemented in a system, such as the system 100. The processing resource 604 may be the processor 102. The non-transitory computer-readable medium 602 may be, for example, an internal memory device or an external memory device. In one implementation, the communication link 606 may be a direct communication link, such as any memory read/write interface. In another implementation, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to a computing environment 610 over the network 608. The computing environment may be, for example, the computing environment 202.

In an example implementation, the non-transitory computer-readable medium 602 includes a set of computer-readable instructions to detect event storms. The set of computer-readable instructions can be accessed by the processing resource 604 through the communication link 606 and subsequently executed to perform acts to detect event storms.

Referring to FIG. 6, in an example, the non-transitory computer-readable medium 602 includes instructions 612 that cause the processing resource 604 to determine, among a plurality of events received in a first time window, a first number of events associated with a first event type. The first event type may be one of a plurality of event types and the determination may be performed based on event attributes of each event and based on a first set of event attributes corresponding to the first event type. For example, an event may be determined as being associated with the first event type in response to the event having each event attribute of the first set of event attributes. In an example, each event type corresponds to an amount of resource consumed by an event associated with the event type. The first event type may be, for example, the first event type 226.

The non-transitory computer-readable medium 602 includes instructions 614 that cause the processing resource 604 to detect whether events associated with the first event type received in the first time window are part of an event storm based on the first number of events and a first threshold associated with the first event type. For example, if the first number of events exceeds the first threshold, the events associated with the first event type received in the first time window may be determined as being part of an event storm.

In an example, the non-transitory computer-readable medium 602 includes instructions to determine, among a plurality of events received in a second time window, a second number of events associated with the first event type. The second time window is bigger than and overlaps with the first time window. For example, the first time window may be the first time window 304 and the second time window may be the second time window 306. Based on the second number of events and a second threshold associated with the first event type, it may be detected whether the events associated with the first event type that are received in the second time window are part of an event storm.

In an example, the plurality of event types includes a second event type, which may have a third time window, fourth time window, third threshold, and fourth threshold associated with itself. The fourth time window may be bigger than and may overlap with the third time window. The third time window, fourth time window, third threshold, and fourth threshold may be different from the first time window, second time window, first threshold, and second threshold, respectively.

The present subject matter categorizes events into different event types, each of which correspond to a particular amount or range of resource consumption, thereby enabling determination of resource consumption due to the events received. Further, by providing a threshold number of events corresponding to each event type, the sensitivity to events consuming greater amount of resources can be increased. Still further, the present subject matter can be used for detection of event storms involving events that are generated at a relatively smaller frequency, but that consume relatively a larger amount of resources.

The techniques of the present subject matter do not utilize pattern matching techniques to detect event storms, and can be achieved merely by configuring various time windows and associated thresholds, and. Therefore, the present subject matter is simpler to implement and can be implemented in a production environment with little overhead.

Although implementations of detection of event storms have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a machine-readable storage medium comprising instructions executable by the processor to:
receive a plurality of events from a plurality of devices within a computing environment via a network interface;
determine, based on event attributes of each of the plurality of events received in a first time window, a first number of events associated with a first event type that are received in the first time window, wherein the first event type is one of a plurality of event types, wherein each event type of the plurality of event types corresponds to an amount of resource consumed by an event associated with the event type, wherein the first event type includes a first event attribute having a first event attribute type that is event significance;

detect whether events associated with the first event type received in the first time window are part of an event storm based on a comparison between the first number of events and a first threshold, the first threshold being associated with the first event type and the first time window; and suppress each event of the first number of events in response to detecting that the events associated with the first event type received in the first time window are part of an event storm.

2. The system of claim 1, wherein the instructions executable by the processor to:

determine, based on event attributes of each event received in a second time window, a second number of events associated with the first event type that are received in the second time window; and detect whether events associated with the first event type received in the second time window are part of an event storm based on a comparison between the second number of events and a second threshold, the second threshold being associated with the first event type and the second time window.

3. The system of claim 2, wherein the second time window is bigger than and overlaps with the first time window.

4. The system of claim 1, wherein the instructions are executable by the processor to:

determine, based on event attributes of each event received in a third time window, a third number of events associated with a second event type that are received in the third time window; and detect whether events associated with the second event type received in the third time window are part of an event storm based on a comparison between the third number of events and a third threshold, wherein resource consumption of events associated with the second event type is different from resource consumption of events associated with the first event type, the third threshold is associated with the second event type and the third time window, the third time window is different from the first time window, and the third threshold is different from the first threshold.

5. The system of claim 1, wherein the instructions are executable by the processor to determine an event as being associated with the first event type in response to the event having the first event attribute.

6. The system of claim 5, wherein the first event attribute comprises a pairing of the first event attribute type and a first event attribute value for the first event attribute type, wherein the first event attribute value is one of a plurality of possible values for the first event attribute type; and the instructions are executable by the processor to determine that the event has the first event attribute if, for the event, a value for the first event attribute type is the first event attribute value.

7. The system of claim 1, wherein the the plurality of event types correspond to a set of event attributes, the set of event attributes including pairings of event attribute types and event attribute values, and the event attribute types including:

a device at which an event originated, wherein possible values for the device comprise a first server and a first switch, a component of the device to which the event relates, wherein possible values for the component of the device comprise a baseboard management controller (BMC) of the first server and a first port of the first switch, and an event significance of the event, wherein possible values for the event significance comprise information and lifecycle.

8. The system of claim 1, wherein each event is associated with a computing environment.

9. The system of claim 1, wherein a resource consumed by each event is a processor resource or a memory resource.

10. The method of claim 1, wherein a plurality of possible values for the event significance includes information and lifecycle.

11. A method comprising:

receiving, by a processing resource, a first time window and a first threshold that is associated with a first event type and the first time window, wherein the first event type corresponds to a first set of event attributes, wherein the first set of event attributes includes a first event attribute type that is event significance and a value of the event significance includes information or lifecycle, wherein the first event type is one of a plurality of event types, and wherein each event type corresponds to an amount of resource consumed by an event associated with the event type;

receiving a plurality of events from a plurality of devices within a computing environment via a network interface;

performing, by the processing resource, a first determination as to whether a first number of events of the plurality of events associated with the first event type received in the first time window exceeds the first threshold, wherein an event is determined as being associated with the first event type in response to the event having each event attribute of the first set of event attributes;

detecting, by the processing resource, whether events associated with the first event type received in the first time window are part of an event storm based on the first determination; and suppressing, by the processing resource, each event of the first number of events in response to detecting that the events associated with the first event type received in the first time window are part of an event storm.

12. The method of claim 11, comprising:

receiving a second time window and a second threshold associated with the first event type;

performing a second determination as to whether a second number of events associated with the first event type received in the second time window exceeds the second threshold; and detecting whether events associated with the first event type received in the second time window are part of an event storm based on the second determination.

13. The method of claim 12, wherein the second time window is bigger than and overlaps with the first time window.

14. The method of claim 11, comprising:

receiving a third time window and a third threshold associated with a second event type;

performing a third determination as to whether a third number of events associated with the second event type received in the third time window exceeds the third threshold; and detecting whether events associated with the second event type received in the third time window are part of an event storm based on the third determination, wherein
- resource consumption of events associated with the second event type is different from resource consumption of events associated with the first event type,
- the third threshold is associated with the second event type and the third time window,
- the third time window is different from the first time window, and
- the third threshold is different from the first threshold.

15. The method of claim 11, wherein each event is received from a data center.

16. A non-transitory computer-readable medium comprising instructions for detection of event storms, the instructions being executable by a processing resource to:
- receive a plurality of events from a plurality of devices within a computing environment via a network interface;
- determine, among the plurality of events received in a first time window, a first number of events associated with a first event type of a plurality of event types based on event attributes of each event and based on a first set of event attributes associated with the first event type, wherein each event type corresponds to an amount of resource consumed by an event associated with the event type, and wherein the first set of event attributes includes a first event attribute type that is event significance;
- detect whether events associated with the first event type received in the first time window are part of an event storm based on the first number of events and a first threshold associated with the first event type; and
- suppress each event of the first number of events in response to detecting that the events associated with the first event type received in the first time window are part of an event storm.

17. The non-transitory computer-readable medium of claim 16, wherein the instructions are executable by the processing resource to:
- determine, among a plurality of events received in a second time window that is bigger than and that overlaps with the first time window, a second number of events associated with the first event type; and
- detect whether events associated with the first event type received in the second time window based on the second number of events and a second threshold associated with the first event type.

18. The non-transitory computer-readable medium of claim 16, wherein the instructions are executable by the processing resource to determine an event as being associated with the first event type in response to the event having each event attribute of the first set of event attributes.

19. The non-transitory computer-readable medium of claim 16, wherein
- the plurality of event types comprises a second event type,
- resource consumption of events associated with the second event type is different from resource consumption of events associated with the first event type,
- the first time window, second time window, first threshold, and second threshold are different from third time window, fourth time window, third threshold, and fourth threshold, respectively, associated with the second event type.

20. The non-transitory computer-readable medium of claim 19, wherein the second time window is bigger than and overlaps with the first time window and wherein the fourth time window is bigger than and overlaps with the third time window.

* * * * *